United States Patent

Karstedt et al.

[15] 3,671,546
[45] June 20, 1972

[54] FLUORINATED ALIPHATIC ACIDS AS PROCESSING AIDS FOR SILICONE RUBBER COMPOSITIONS

[72] Inventors: Bruce D. Karstedt, Charlotte, N.C.; John S. Razzano, Troy, N.Y.

[73] Assignee: General Electric Company

[22] Filed: Oct. 1, 1970

[21] Appl. No.: 77,369

[52] U.S. Cl. .................................... 260/37 SB, 260/31.2 R
[51] Int. Cl. .......................................................... C08g 51/04
[58] Field of Search ...................... 260/37 SB, 31.2 R, 46.5

[56] References Cited

UNITED STATES PATENTS 3,238,157    3/1966    Smith .............................. 260/37 SB X
3,551,382    12/1970   Schnurrbusch et al. ......... 260/37 SB X

*Primary Examiner*—Lewis T. Jacobs
*Attorney*—Donald J. Voss, E. Philip Koltos, Frank L. Neuhauser, Oscar B. Waddell and Joseph B. Forman

[57] ABSTRACT

A silicone rubber composition of improved processing characteristics including (a) a polydiorganosiloxane having the formula,

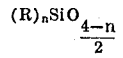

$$(R)_n SiO_{\frac{4-n}{2}}$$

(b) a structure defining inorganic filler, (c) a process aid and (d) a fluorine-substituted hydrocarbon acid where R is a monovalent hydrocarbon radical and $n$ has a value of from 1.98 to 2.01 inclusive. The above composition is used with a peroxide curing agent at elevated temperatures to produce a cured silicone rubber.

14 Claims, No Drawings

FLUORINATED ALIPHATIC ACIDS AS PROCESSING AIDS FOR SILICONE RUBBER COMPOSITIONS

BACKGROUND OF THE INVENTION

The present invention relates to organopolysiloxane compositions and more particularly the invention relates to organopolysiloxane compositions which are convertible to the hard, cured, elastic state by heating the composition at an elevated temperature in the presence of a curing agent wherein the present invention contemplates the use of a processing aid which facilitates the process for producing the cured rubber and results in the cured rubber having advantages heretofore not attained by existing rubbers.

In the manufacture of heat curable silicone rubber, an organopolysiloxane gum which is convertible to the solid, cured, elastic state is first manufactured. This organopolysiloxane gum is then mixed with an inorganic filler to form a homogeneous mixture. To the resulting mixture there is added a curing agent which will decompose at elevated temperatures to cross-link and cure the organopolysiloxane gum. The mixture of the organopolysiloxane, filler and curing agent, as well as other ingredients which are compounded therein, such as coloring agents, is known as the silicone rubber composition. These silicone rubber compositions often stand for periods of two months or more before they are placed on a mill and additional ingredients may then be compounded into the silicone rubber stock and after a smooth, continuous sheet is formed from the rubber mill the sheet may be taken in and formed into the desired article. The shaped silicone rubber article may then be heated at elevated temperatures to cure the silicone rubber to a hard, elastic form.

The most common useful fillers for such silicone rubber compositions are finely divided reinforcing silica fillers. These fillers when present in a silicone rubber composition can cause the compositions to structure or partially set upon standing or storage. While other inorganic fillers cause such structuring, such structuring is especially advanced with the finely divided reinforcing silica fillers. Further, the longer the time a silicone rubber composition is stored, the more prevalent the structuring. In some cases after such silicone rubber compositions have been stored for a period of 2 weeks or more, the silicone rubber composition has set to the point that a smooth, continuous sheet cannot be formed from it on the rubber mill. More importantly, however, such silicone rubber compositions that have been stored for a period of 1 week or more produce cured silicone rubber compounds with lower physical properties as compared to articles that are made with fresh silicone rubber compositions. Further, as can be appreciated, the structured silicone rubber composition is very difficult to handle and process. As a result of these difficulties, a number of process aids have been devised, which process aids are mixed with the organopolysiloxane gum to prevent the uncured compositions from structuring. Examples of such process aids are to be found in Fekete U.S. Pat. No. 2,954,357, Martellock U.S. Pat. No. 3,464,945, Konkle U.S. Pat. No. 2,890,188 and Martellock U.S. Pat. No. 3,243,404.

Although the process aids described in the above patents alleviate structuring of the final silicone rubber compositions, they are not particularly helpful in aiding or facilitating the inclusion of the silica filler into the organopolysiloxane in the initial mixing. Thus, difficulties are encountered in mixing the silica fillers into organopolysiloxanes since the filler tends to stick to the cover and walls of the mixing equipment due to static effects. Further, an inordinate amount of time is required for the silica filler to wet into the polysiloxane to form a well massed state and as a result of static effects unduly larger amounts of gelled balls and agglomeratized flaws are formed in the organopolysiloxane filler mixture.

In addition, it is desirable to reduce the large amounts of process aids presently used in forming silicone rubber compositions and also reduce the time of the pre-cure heating cycle which is used to remove volatiles from the silicone rubber composition.

Accordingly, it is one object of the present invention to eliminate the normal doughmixer scrape down procedures to remove silica filler which sticks to the walls and cover of the mixer.

It is another object to decrease the time necessary for the filler to be incorporated into the organopolysiloxane gum in a well massed state.

It is another aim to provide an additive for heat curable silicone rubber compositions which will reduce the amount of conventional process aids presently used in silicone rubber compositions.

It is yet another aim to provide an additive for heat curable silicone rubber compositions which will reduce the amount of gelled balls, flaws, and agglomerates in the composition, as well as reduce the time necessary for the pre-cure heating cycle.

These and other objects are accomplished by the silicone rubber compositions provided below.

SUMMARY OF THE INVENTION

In accordance with the present invention there is provided a silicone rubber composition of improved processing characteristics including (a) a polydiorganosiloxane convertible to the solid, cured, elastic state and having the formula, (1) 

(b) a structure defining inorganic filler, (c) from 1 to 100 percent by weight based on the weight of said organopolysiloxane of a process aid and (d) from 100 to 1,000 ppm (parts per million) of a fluorine-substituted hydrocarbon acid based on the weight of said polydiorganosiloxane, where R is a radical selected from the class consisting of alkyl radicals, aryl radicals, aralkyl radicals, alkenyl radicals, cycloalkyl radicals and cycloalkenyl radicals and $n$ has a value of from 1.98 to 2.01, inclusive, and preferably having a value of 2.

The fluorine-substituted hydrocarbon acid has the formula, (2) 

where R' is a radical selected from the same radicals as R and X represents the same radicals as R' and, in addition, chlorine radicals and fluorine radicals and $a$ is a whole number that varies from 0 to 1, inclusive.

There is added to the silicone rubber composition 0.1 to 10 percent by weight based on the weight of the diorganopolysiloxane of a peroxide curing agent so that when the composition is heated at elevated temperatures, the composition will cure to a hard, elastic state.

DESCRIPTION OF THE PREFERRED EMBODIMENT

The radicals R, R' represent monovalent hydrocarbon radicals such as alkyl radicals, e.g., methyl, ethyl, propyl, octyl, octadecyl radicals, etc; aryl radicals, e.g., phenyl, tolyl, xylyl radicals, etc; aralkyl radicals, e.g., benzyl, phenylethyl radicals, etc; cycloalkyl and cycloalkenyl radicals, e.g., cyclohexyl, cycloheptyl, cyclohexenyl radicals, etc; alkenyl radicals, e.g., vinyl, allyl radicals, etc; alkaryl radicals; cyanoalkyl; and haloalkyl, haloalkenyl and haloaryl radicals, e.g., chloromethyl, chlorophenyl, dibromophenyl, trifluoromethylethyl radicals, etc. Preferably, at least 50 percent of the R groups in formula (1) are methyl radicals and the rest are phenyl radicals. Further, preferably 0.1–1 percent of the R groups in formula (1) are vinyl.

There are also within the scope of formula (1) polydiorganosiloxanes which can be copolymers containing two or more different diorganosiloxane units therein and copolymers of dimethylsiloxane units and methylphenylsiloxane units; or copolymers of methylphenylsiloxane units, diphenylsiloxane units, dimethylsiloxane units and methylvinylsiloxane units, as well as copolymers of dimethylsiloxane units, methylvinylsiloxane units and diphenylsiloxane units.

Preparation of the diorganopolysiloxane of formula (1) which can contain both saturated and olefinically unsaturated hydrocarbon groups may be carried out by any of the procedures well known to those skilled in the art. Such polysiloxanes can be produced by following a procedure involving hydrolysis of one or more hydrocarbon-substituted dichlorosilanes in which the substituents consist of saturated hydrocarbon groups to produce a crude hydrolyzate containing a mixture of linear and cyclic polysiloxanes. Further, one or more hydrocarbon-substituted dichlorosilanes whose hydrocarbon substituents comprise one or more olefinically unsaturated hydrocarbon groups are hydrolyzed to produce a crude hydrolyzate containing a mixture of linear and cyclic polysiloxanes. The two crude hydrolyzates are depolymerized by being treated with KOH to form mixtures of low boiling, low molecular weight cyclic polymers and undesirable material such as the monofunctional and trifunctional chlorosilane starting material. The resulting compositions are fractionally distilled and there is collected two pure products containing the low boiling, low molecular weight cyclic polymers free of any significant amount of monofunctional and trifunctional groups.

In order to depolymerize the crude hydrolyzates, there is added to them a catalyst and the mixture is heated at a temperature above 150° C to produce and recover by evaporation a product consisting of low molecular weight cyclic polysiloxanes comprising, for example, about 85 percent of the tetramer and 15 percent of the mixed trimer and pentamer. When the hydrocarbons on the silicon atom are methyl, materials resulting from the presence of monomethyltrichlorosilane in this initial product produced from dimethyldichlorosilane remain as residue in the distillation vessel or tower.

The distillate consisting essentially of low molecular weight cyclic dimethyl polymers, free of any significant amount of monofunctional and trifunctional groups is collected in a vessel. The then dried cyclic siloxane contains less that 5 ppm of water. The cyclic methylvinyl and diphenyl cyclic siloxanes are prepared in the same way.

The pure cyclic siloxanes are added in the desired proportions in a reaction vessel so as to be subjected to an equilibration reaction to form the polysiloxanes of formula (1). Thus, about 2.5–17 mole percent cyclic diphenylsiloxane can be added to 83–97.5 mole percent dimethyl cyclic siloxanes. If desired, and depending on the type of compound that is to be produced, 0.1–1.0 mole percent of methylvinyl cyclic siloxane may be mixed with the dimethyl and diphenyl cyclic siloxane or other desired proportions of the cyclic siloxanes may be used to produce the desired polymer. To the above mixture of pure cyclic siloxanes there is added as a polymerization catalyst, such as KOH. The KOH breaks the ring of cyclic siloxanes to form a potassium silanolate which has the formula,

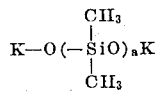

This compound, the potassium silanolate, thus can attack other cyclics to break the rings and increase the chain length of the siloxanes formed. There is further added to the reaction mixture an amount of one or more monofunctional compounds calculated to function as end-blockers for limiting the degree of polymerization and consequently the lengths and molecular weights of the linear polysiloxane chains and for stabilizing the polymers. Usually a small amount of monofunctional compounds are added to function as end-blockers so as to regulate the chain length of the polymers. Preferably, a compound is used as the chain-stopped groups having the formula,

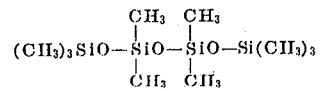

Other monofunctional compounds that may be employed satisfactorily for controlling polymer growth include, among others, hexamethyldisiloxane, tetramethyldiethoxydisiloxane, diethyltetraethoxydisiloxane and divinyltetraethoxydisiloxane.

The equilibration reaction is carried out from 2 to 4 hours until about 85 percent of the cyclic diorganosiloxanes have been converted to polymers end-stopped with monofunctional groups. When the 85 percent conversion point has been reached, there are just as many polymers being converted to the cyclic siloxanes as there are cyclic siloxanes being converted to the polymer. At that time there is added to the mixture a sufficient amount of an acid donor, such as phosphorous acid, that will neutralize the KOH catalyst so as to terminate the polymerization reaction. The cyclic diorganosiloxanes in the reaction mixture are then distilled off to leave the polydiorganosiloxane gum which is useful in the present invention.

Alternatively, the mixture of polydiorganosiloxane may be then further reacted with the cyclic siloxanes therein and then during compounding of the mixture with process aid and fillers on a doughmixer, the remaining cyclic siloxanes may be removed by a gas purge.

The polydiorganosiloxane is produced so that it preferably registers a penetration of 50–4,000 mm per minute on a standard penetrameter. Further, the polymer preferably has a molecular weight in the range of 100,000 to 2,000,000 and a viscosity of 1,000,000 to 100,000,000 centipoise.

Hydrocarbon-substituted polysiloxanes whose pendant groups consist largely of groups other than methyl, such as ethyl or other saturated hydrocarbon groups and olefinically unsaturated hydrocarbon groups other than, or in addition to, vinyl groups can be produced by means of procedures similar to that described above or by means of procedures modified in accordance with the known characteristics of the various hydrocarbon groups to be included.

The polydiorganosiloxane gum employed is preferably produced under conditions so controlled as to avoid the incorporation therein of any significant amounts of tri-functional compounds, groups, or molecules to avoid cross-linking of linear polysiloxane chains through silicon and oxygen atoms and the incorporation therein of any significant amount of monofunctional compounds or radicals than those specifically provided to serve as end-blockers for limiting the degree of polymerization. Accordingly, the starting polydiorganosiloxane gum contains 2.0 hydrocarbon groups per silicon atom. Deviations from a ratio of 2 to 1, for example, ratios of 1.98 to 2.01, will be insignificant for all practical purposes since it will attribute to the presence of other hydrocarbon groups whose total numbers will be insignificant as compared with the total number of hydrocarbon groups attached to silicon atoms of linear polysiloxane chains.

In producing the silicone rubber composition of the present invention there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials as titanium, iron oxide, aluminum oxide, as well as the inorganic filler materials known as inert fillers which can include among others, diatomaceous earth, calcium carbonate and quartz can preferably be employed in combination with highly reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surface-bonded alkoxy groups.

There is preferably employed in the present compositions 10–200 percent by weight of said polysiloxane gum of the inorganic filler and preferably 20 to 60 percent by weight.

There is also employed in the present composition 1 to 25 percent and preferably 5 to 50 percent by weight based on the polydiorganosiloxane gum of a process aid for preventing the gum and the filler mixture from structuring prior to curing and after compounding. One example of such a process aid is a compound of the formula, (3) 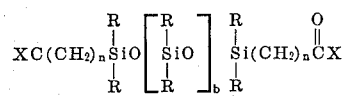

where R is a member selected from the class consisting of methyl and phenyl, X is a member selected from the class consisting of —OH, —NH$_2$ or —OR', where R' is methyl or ethyl, $n$ has a value of from 2 to 4, inclusive, and $b$ is a whole number equal to from 0 to 10, inclusive. Further details as to the properties, as well as the method of preparation of the compound of formula (3), are to be found in the disclosure of Martellock U.S. Pat. No. 3,464,945 which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least 4 and as much as 35 and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. No. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosiloxane from one OH to 70 silicon atoms to two OH per silicon atom.

The hydroxylated siloxanes may be prepared by any suitable method, such as heating said siloxanes with steam under pressure at temperatures of about 120° C or hydrolyzing silanes of the formula $R_nSiX_{4-n}$ where X is any hydrolyzable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclicaryl hydrocarbon radicals. Further, detailed information as to the hydroxylated organosiloxanes which may be used as process aids is to be found in Konkle et al. U.S. Pat. No. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

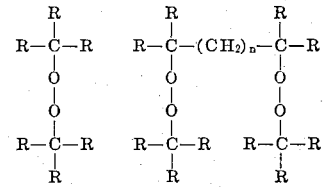

wherein R represents the same alkyl group throughout or alkyl groups of two or more different types and $n$ is zero or a larger integer.

Among the specific peroxide curing catalysts that are preferred are di-tertiary-butyl peroxide, tertiary-butyl-triethylmethyl peroxide, tertiary-butyl-tertiary-butyl-tertiary-triphenyl peroxide and di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as 1,4-dichlorobenzoyl peroxide; 2,4-dichlorobenzyol peroxide, monochlorobenzoyl peroxide, benzoyl peroxide, etc. Generally, 0.1–10 percent of said peroxide by weight of the polydiorganosiloxane gum is used to cure the silicone rubber composition and preferably 0.5–3.0 percent by weight.

The fluorine-substituted hydrocarbon acid which is the advantageous processing acid of the present invention includes fluorine-substituted hydrocarbon monocarboxylic acids and fluorine-substituted hydrocarbon dicarboxylic acids. These acids may also include other substitutents such as chlorine atoms. The fluorine acids include fluoroacetic, difluoroacetic, trifluoroacetic, chlorodifluoroacetic, 2-fluoropropanoic, 2-dluorobutanoic, 2,3-difluoropentanoic, fluoromalonic, perfluorosuccinic, and perfluoroglutanic acids. The preferred processing aids contain at least two fluorine atoms and in the case of monocarboxylic acids from two to 10 carbon atoms while in the use of dicarboxylic acids, from three to 10 carbon atoms.

While the fluorine-substituted hydrocarbon acid of formula (1) is the preferred processing aid, a fluorine-substituted dicarboxylic acid may be used as a processing aid and having the formula,

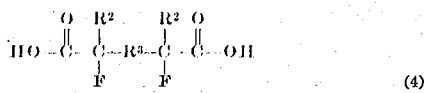

(4)

where $R^2$ is selected from hydrogen, fluorine, and the same radicals as represented by $R'$ and $R^3$ is a divalent hydrocaron radical such as alkylene or arylene.

The processing aids of formulas (2) and (3) are formed by fluorinating the corresponding hydrocarbon acid with HF in the presence of an electric current to produce the resulting fluorinated compound and then acidifying it with a strong acid such as HCl. Thus, in the case of acetic acid, the acid is placed in a water solution of hydrofluoric acid and a current of 5 volts is passed through the solution for 5 minutes. The resulting fluorinated compound is distilled off and collected. The fluorinated compound is then hydrolyzed with $H_2O$ to produce the desired trifluoroacetic acid. Trifluoroacetic acid is the preferred processing acid of the present invention. Generally, 100 to 1,000 ppm of trifluoroacetic acid is used as the processing aid based on the weight of polydiorganosiloxane gum and preferably 400–800 ppm. If less than 100 ppm is used, then there is not the desired effect in the processing of the silicone rubber compositions. If more than 1,000 ppm is used, then the large amount of acid has a deleterious effect on the physical properties of the final silicone rubber composition.

While the silicone rubber compositions of the present invention can be produced by a number of methods, it is preferred that the process aid component, as well as the processing aid component of formulas (2) or (4) be incorporated into the composition at a time no later than the incorporation of the structure-inducing filler into the silicon composition. Thus, it is possible that the polydiorganosiloxane gum be mixed with the process aid and the fluorinated aliphatic acid and then the desired amount of the structure-inducing silica filler is thereafter added. The mixing is preferably carried out on differential milling rolls or in a doughmixer. Alternatively, the mixing operation can be carried out by mixing polydiorganosiloxane gum, the process aid, the fluorinated hydrocarbon acid and the silica filler together at the same time in a differential mill or doughmixer. After the mixing is completed, the silicone rubber composition free of the curing atent is precured or heated to an elevated temperature of 170°-300° C for 2 hours or more to devolatilize the fluorinated hydrocarbon acid and then purge it from the silicone rubber composition. Further, this type of process aging provides opportunities for better wetting of the fillers by the gums. In addition, the pre-cure heat aging treatment provides the further advantage of effective elimination of objectionable volatile materials such as water and adsorbed gases carried into the compounds by the fillers. The curing agent is then mixed into the pre-cured treated silicone rubber composition and then the composition is ready to be stored and cured whenever it is deemed desirable.

The amount of highly reinforced silica employed with silicone gums to produce silicone compounds and silicone elastomers depends upon the tensile strength as well as on the hardness properties desired in the elastomer. Where high tensile strength and high hardness values are required, the filler employed will comprise for the most part a highly reinforcing silica and can contain small amounts of other types of filler materials. In the production of silicone elastomer tape coatings or silicone elastomer rubber compounds, where high tensile strength and high hardness values are not as important, lesser amounts of highly-reinforcing silica can be employed together with larger amounts of other types of fillers.

When the highly reinforcing silica fillers employed in this invention are highly acidic in nature, as for example having a pH of 4 or less, it is often times desirable to add thereto onto the silicone compounds, materials which tend to neutralize the effects caused thereby. In such instances, buffers such as the alkaline earth compounds, including calcium zirconate, barium zirconate and the like, can be added in appropriate amounts to the fillers or to the mixture of polydiorganosiloxane gum, process aid, fluorinated hydrocarbon acid and silica filler during compounding.

As a result of the use of the fluorinated hydrocarbon acid there is elimination of the normal doughmixer scrap down procedures in view of the ability of the acid to virtually remove static effects causing filler particles to cling to the cover and walls of the equipment used. Further, there is a considerable decrease in the time required for the fumed silica fillers to be wet by the polydiorganosiloxane gums and for the filler and gum to be mixed into a well massed state. Another advantage associated with the use of the fluorinated hydrocarbon acid is that a lower concentration of the process aids is required and further there is a well mixed useful product at the beginning of the compounding throughout the work and final preparative steps.

There are also formed lesser quantities of gel particles, agglomerates or flaws distinguishable from the well massed mixture of siloxane gum, process aid, fluorinated aliphatic acid and filler. It is also noticed that the physical physical of the cured silicone rubber are more reproducible as well as having a higher tensile strength and having a better heat age retention of the original vulcanized rubber physical profile.

The use of the fluorinated hydrocarbon acid shortens the pre-cure heating cycle with a gas purge and the pre-cured silicone rubber composition reaches the same end point as was obtained previously with the longer pre-curing cycles. It is thus obvious that the use of the processing aid, i.e., a fluorinated hydrocarbon acid, greatly facilitates and expedites the process for producing the final silicone rubber composition. One outstanding advantage of fluorinated hydrocarbon acid and particularly trifluoroacetic acid, is that it can be easily removed from the mixture of siloxane gum, filler and process aid in the pre-cure heat cycle so that it has no effect on the cured silicone rubber composition.

The following examples are given for the purpose of illustrating the invention and are not intended to limit or restrict the invention in any way. All parts are by weight unless specified otherwise.

EXAMPLE 1

There was placed in a doubhmixer a first composition containing 100 parts of a dimethylpolysiloxane polymer having 0.2 mole percent of methylvinyl groups chainstopped with trimethylsiloxy chain-stopping units and having a viscosity of 20,000,000 centipoise at 25° C. The volatiles had not been removed from this polymer.

There was mixed into this polymer 7 parts of a process aid which was a low molecular weight dimethylpolysiloxane fluid which was methoxy-stopped and is the type of process aid described in U.S. Pat. No. 2,954,357. There was also added to the mixture 5 parts of octamethyltetrasiloxane which compound was added as additional process aid. In addition, there was added to the above compound 0.01 part of trifluoroacetic acid. After the above ingredients were mixed together there was added to the resulting mixture 20 parts of silica filler and the silica filler was thoroughly mixed in with the other ingredients. At the same time the mixing of the silica filler was being carried out, there was a nitrogen purge over this mixture and the mixture was heated to 150°-170° C to drive off volatiles.

A second composition was prepared as above with the same amount and same type of ingredients with the exception that no trifluoroacetic acid was used. The percent volatiles remaining in this composition during the gas purge as well as pre-cure heating time is given below as found in both compositions.

| Pre-Cure Heating Time (Minutes) | Composition with Trifluoroacetic Acid % Volatiles | Composition without Trifluoroacetic Acid % Volatiles |
|---|---|---|
| 0 | 11.0 | 10.44 |
| 10 | 7.7 | 8.44 |
| 20 | 4.37 | 5.70 |
| 30 | 1.88 | 3.93 |
| 45 | .89 | 1.81 |
| 60 | 0.5 | 0.9 |
| 90 | 0.34 | 0.66 |

Usually during production operations, the pre-cure heating and mixing cycle is carried out until there is about 2–4 percent volatiles left in the composition. It can be seen from the data that the compositions with trifluoroacetic acid reached the 2 percent volatiles level in about 33 percent shorter time than it was reached by the composition without the trifluoroacetic acid. This difference in devolatilization time would be even more pronounced in plant operations since the laboratory doughmixer is considerably more efficient in removing volatiles than is the plant doughmixer.

Further, the compositions with the trifluoroacetic acid mixed more easily with silica filler to form a well massed state and fewer particles of filler adhered to the cover and walls of the doughmixer. In addition, the compositions with the trifluoroacetic acid mixed uniformly there in the silica filler and formed fewer balls of filler in the mixture than was present in the composition without the trifluoroacetic acid.

In summary, the processing of the silica filler with the rest of the ingredients so as to obtain a uniform composition was considerably improved by the use of trifluoroacetic acid. Further, as illustrated by the data obtained, the use of trifluoroacetic acid permitted the composition to be devolatilized at a considerably faster rate especially in plant operation, thus reducing the cost of producing the cured silicone rubber. Further, the above advantages resulted in producing cured silicone rubber with more reproducible physical properties and better physical properties than was the case when trifluoroacetic acid was not used as a processing aid.

What I claim is:

1. A silicone rubber composition of improved processing characteristics comprising (a) a polydiorganosiloxane convertible to the solid, cured, elastic state and having the formula:

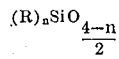

(b) 10–200 percent by weight of a structure defining inorganic filler based on the weight of said organopolysiloxane, (c) from 1 to 25 percent by weight based on the weight of said organopolysiloxane of a silicone structure-controlling additive and (d) from 100 to 1,000 ppm of a fluorine-substituted hydrocarbon acid based on the weight of said polydiorganosiloxane and selected from the class consisting of compounds of the formula,

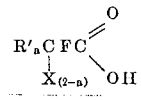

and compounds of the formula,

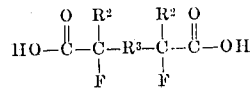

where R and R' are radicals selected from the class consisting of alkyl radicals, aryl radicals, aralkyl radicals, alkenyl radicals, cycloalkyl radicals and cycloalkenyl radicals, n has a 2. The silicone rubber composition of claim 2 wherein R is selected from the class consisting of methyl and phenyl and wherein at least 50 percent of the R radicals are methyl.

4. The silicone rubber composition of claim 3 wherein the silicone structure-controlling additive is a hydroxylated organosilane having a silicon-bonded OH content of from one OH per 70 silicon atoms to 2 OH per silicon atom and having from 1.9 to 2.1 hydrocarbon radicals per silicon atom, said radicals being selected from the group consisting of alkyl radicals, radicals of less than six carbon atoms and monocyclic aryl hydrocarbon radicals with any remaining valences of the silicon atoms in the hydroxylated silane being satisfied by oxygen atoms.

5. The silicone rubber composition of claim 3 wherein the silicone structure-controlling additive is a dihydrocarbon-substituted polysiloxane oil having a hydrocarbon substituent to silicon atom ratio of from 1.6 to 2.0 and where said hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms.

6. The composition of claim 4 further including 0.1 to 10 percent by weight of a peroxide curing agent based on the weight of said polydiorganosiloxane and selected from the group consisting of benzoyl peroxide, di-tertiary-butyl peroxide, tertiary-butyl-triethylmethyl peroxide, tertiary-butyl-tertiary-triptyl peroxide and dicumyl peroxide, and 2,4-dichlorobenzoyl peroxide.

7. A process for forming a heat-curable silicone rubber composition comprising mixing a polydiorganosiloxane convertible to the solid, cured, elastic state and having the formula,

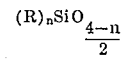

with 1 to 25 percent by weight based on the weight of said polydiorganosiloxane of a silicone structure-controlling additive and 100 to 1,000 ppm of a fluorine-substituted hydrocarbon based on the weight of said polydiorganosiloxane and selected from the class consisting of compounds of the formula,

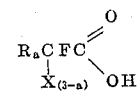

and compounds of the formula,

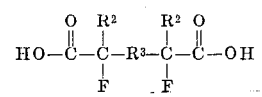

and then adding to said mixture a structure-defining inorganic filler where R and R' are radicals selected from the class consisting of alkyl radicals, aryl radicals, aralkyl radicals, alkenyl radicals, cycloalkyl radicals, and cycloalkenyl radicals, n has a value that varies from 1.98 to 2.01, inclusive, X is a radical selected from the class consisting of chlorine, fluorine, and the same radicals as R', $R^2$ is selected from the class consisting of hydrogen, fluorine and the same radicals as R', $R^3$ is selected from the class consisting of alkylene and arylene radicals, and n is a whole number that varies from 0 to 1, inclusive.

8. The process of claim 7 wherein the fluorine-substituted hydrocarbon acid is trifluoroacetic acid.

9. The process of claim 7 wherein there is added 10–200 percent of said inorganic filler based on the weight of said polydiorganosiloxane.

value of from 1.98 to 2.01, inclusive, X is a radical selected from the class consisting of chlorine, fluorine and the same radicals as R', $R^2$ is selected from the class consisting of hydrogen, fluorine, and the same radicals as R', $R^3$ is selected from the class consisting of alkylene and arylene radicals, and $a$ is a whole number that varies from 0 to 1, inclusive.

2. The silicone rubber composition of claim 1 wherein the fluorine-substituted hydrocarbon acid is trifluoroacetic acid.

10. The process of claim 7 wherein the final mixture containing the organic filler is heated to 150°–200° C for 2–12 hours.

11. The process of claim 10 wherein after the heating step there is added to the resulting mixture 0.1 to 10 percent by weight of a peroxide curing agent based on the weight of the polydiorganosiloxane and selected from the group consisting of benzoyl peroxide, di-tertiary-butyl peroxide, tertiary-butyl-triethylmethyl peroxide, tertiary-butyl-tertiary-triptyl peroxide, dicumyl peroxide and 2,4-dichloro-benzoyl peroxide.

12. The process of claim 8 wherein R is selected from the class consisting of methyl and phenyl and wherein at least 50 percent of the R radicals are methyl.

13. The process of claim 8 wherein the silicone structure-controlling additive is a hydroxylated organosilane having a silicon-bonded OH content of from one OH per 70 silicon atoms to two OH per silicon atom and having from 1.9 to 2.1 hydrocarbon radicals per silicon atom, said radicals being selected from the group consisting of alkyl radicals of less than six carbon atoms and monocyclic aryl hydrocarbon radicals with any remaining valences of the silicon atom in the hydroxylated silane being satisfied by oxygen atoms.

14. The process of claim 8 wherein the silicone structure-controlling additive is a dihydrocarbon-substituted polysiloxane oil having a hydrocarbon substituent to silicon atom ratio of from 1.0 to 2.0 and where said hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon groups.

* * * * *